United States Patent
Jager et al.

(10) Patent No.: US 12,189,556 B2
(45) Date of Patent: Jan. 7, 2025

(54) SYSTEM AND METHOD FOR A SERIAL PERIPHERAL INTERFACE

(71) Applicant: DENSO CORPORATION, Aichi (JP)

(72) Inventors: Karl Jager, Southfield, MI (US);
Daniel Hill, Southfield, MI (US);
Andrew Driscoll, Southfield, MI (US)

(73) Assignee: DENSO CORPORATION, Kariya (JP)

( * ) Notice: Subject to any disclaimer, the term of this patent is extended or adjusted under 35 U.S.C. 154(b) by 44 days.

(21) Appl. No.: 18/201,214

(22) Filed: May 24, 2023

(65) Prior Publication Data
US 2023/0385216 A1    Nov. 30, 2023

Related U.S. Application Data

(60) Provisional application No. 63/345,211, filed on May 24, 2022.

(51) Int. Cl.
*G06F 13/362*    (2006.01)
*G06F 13/42*    (2006.01)

(52) U.S. Cl.
CPC ........ *G06F 13/362* (2013.01); *G06F 13/4221* (2013.01)

(58) Field of Classification Search
CPC .......................... G06F 13/362; G06F 13/4221
See application file for complete search history.

(56) References Cited

FOREIGN PATENT DOCUMENTS

| CN | 104641609 B | * | 3/2018 | ......... G06F 13/4022 |
| EP | 2530598 B1 | * | 2/2021 | ......... G06F 12/0855 |
| JP | 6129976 B2 | * | 5/2017 | ......... G06F 13/1652 |

OTHER PUBLICATIONS

English Translation of CN-104641609-B (Year: 2018).*
Translation of JP-6129976-B2 (Year: 2017).*

* cited by examiner

*Primary Examiner* — Henry Tsai
*Assistant Examiner* — John B Roche
(74) *Attorney, Agent, or Firm* — Warner Norcross + Judd LLP

(57) ABSTRACT

A system and method are provided to enable first and second devices coupled to a SPI bus to operate as master devices on the SPI bus without collisions between the two devices or race conditions with respect to obtaining control over the SPI bus.

29 Claims, 3 Drawing Sheets

SYSTEM AND METHOD FOR A SERIAL PERIPHERAL INTERFACE

FIELD OF INVENTION

The present disclosure relates to the field of communications via a serial peripheral interface (SPI), and more particularly toward communicating with a slave device via a SPI.

BACKGROUND

In conventional SPI communication systems, a single master device is operable to direct communications with one or more slave devices via a SPI bus. Use of a single master device can impede communications or involve additional circuitry in cases where multiple devices need access to another device on the SPI bus. Because the SPI bus is configured for a single master device, circuit and system designers have accepted these limitations as a tradeoff for using the well-defined SPI interface.

SUMMARY

In general, one innovative aspect of the subject matter described herein can be embodied in a system for communicating with a slave device via a slave SPI. The system may include a serial bus configured to facilitate communications with the slave SPI, a first master device operably coupled to the serial bus to communicate with the slave device via the slave SPI, and a second master device operably coupled to the serial bus to communicate with the slave device via the slave SPI.

The system may include an arbitration interface established between the first master device and the second master device. The arbitration interface may include a SPI hold signal and a SPI arbitration signal, where the SPI arbitration signal may be toggled between an arbitration high state and an arbitration low state. The first master device may be operable to identify availability of the serial bus based on 1) the SPI arbitration signal being the arbitration high state and 2) detection of the SPI hold signal being in an available state. The second master device may be operable to identify availability of the serial bus based on 1) the SPI arbitration signal being the arbitration low state and 2) detection of the SPI hold signal being in the available state.

The foregoing and other embodiments can each optionally include one or more of the following features, alone or in combination. In particular, one embodiment includes all the following features in combination.

In some embodiments, the system may include the first master device being operable to detect a state of the SPI hold signal in response to a rising edge of the SPI arbitration signal that corresponds to a transition from the arbitration low state to the arbitration high state. The second master device may be operable to detect the state of the SPI hold signal in response to a falling edge of the SPI arbitration signal that corresponds to a transition from the arbitration high state to the arbitration low state and the SPI hold signal being in an available state.

In some embodiments, the system may include the first master device and the second master device being operable to abstain from controlling the serial bus despite the serial bus being respectively available for the first master device and the second master device.

In some embodiments, the system may include the first master device being operable to change the SPI hold signal to an unavailable state based on identifying availability of the serial bus, whereby the first master device may be operable to control the serial bus in response to changing the SPI hold signal to the unavailable state.

In some embodiments, the system may include the first master device being operable to communicate with the SPI of the slave device via the serial bus while controlling the serial bus.

In some embodiments, the system may include the first master device being operable to control the serial bus for a first control duration.

In some embodiments, the system may include the SPI arbitration signal being toggled periodically according to an arbitration period.

In some embodiments, the system may include the arbitration period being shorter in duration than the first control duration.

In some embodiments, the system may include the first master device being configured to limit the first control duration to a maximum control duration.

In some embodiments, the system may include the first master device being operable to change the SPI hold signal to an available state to release control of the serial bus.

In some embodiments, the system may include the second master device being operable to change the SPI hold signal to an unavailable state based on identifying availability of the serial bus.

In general, one innovative aspect of the subject matter described herein can be embodied in a method of communicating with a slave device via a slave SPI. The method may include providing a serial bus configured to facilitate communications with the slave SPI, toggling a SPI arbitration signal between an arbitration high state and an arbitration low state.

The method may include identifying, in a first master device, availability of the serial bus based on 1) the SPI arbitration signal being the arbitration high state and 2) detection of a SPI hold signal being in an available state. The method may include identifying, in a second master device, availability of the serial bus based on 1) the SPI arbitration signal being the arbitration low state and 2) detection of the SPI hold signal being in the available state; and changing, by the first master device, the SPI hold signal to an unavailable state based on identifying availability of the serial bus. The first master device may be operable to control the serial bus in response to changing the SPI hold signal to the unavailable state.

The foregoing and other embodiments can each optionally include one or more of the following features, alone or in combination. In particular, one embodiment includes all the following features in combination.

In some embodiments, the method may include detecting, by the first master device, a state of the SPI hold signal in response to a rising edge of the SPI arbitration signal that corresponds to a transition from the arbitration low state to the arbitration high state, and detecting, by the second master device, the state of the SPI hold signal in response to a falling edge of the SPI arbitration signal that corresponds to a transition from the arbitration high state to the arbitration low state and the SPI hold signal being in an available state.

In some embodiments, the method may include communicating between the first master device and the slave device via the SPI while the first master device controls the serial bus.

In some embodiments, the method may include controlling, by the first master device, the serial bus for a first control duration.

In some embodiments, toggling the SPI arbitration signal may include toggling the SPI arbitration signal periodically according to an arbitration period.

In some embodiments, the arbitration period may be shorter in duration than the first control duration.

In some embodiments, the first master device may be configured to limit the first control duration to a maximum control duration.

In some embodiments, the method may include changing, by the first master device, the SPI hold signal to an available state to release control of the serial bus.

In some embodiments, the method may include changing, by the second master device, the SPI hold signal to an unavailable state based on identifying availability of the serial bus.

In general, one innovative aspect of the subject matter described herein can be embodied in an apparatus that includes at least one memory storing computer program instructions and at least one processor configured to execute the computer program instructions to cause the apparatus at least to provide a serial bus configured to facilitate communications with the slave SPI, toggle a SPI arbitration signal between an arbitration high state and an arbitration low state, identify, in a first master device, availability of the serial bus based on 1) the SPI arbitration signal being the arbitration high state and 2) detection of a SPI hold signal being in an available state, identify, in a second master device, availability of the serial bus based on 1) the SPI arbitration signal being the arbitration low state and 2) detection of the SPI hold signal being in the available state, and change, by the first master device, the SPI hold signal to an unavailable state based on identifying availability of the serial bus. The first master device may be operable to control the serial bus in response to changing the SPI hold signal to the unavailable state.

The foregoing and other embodiments can each optionally include one or more of the following features, alone or in combination. In particular, one embodiment includes all the following features in combination.

In some embodiments, the apparatus may be operable to detect, by the first master device, a state of the SPI hold signal in response to a rising edge of the SPI arbitration signal that corresponds to a transition from the arbitration low state to the arbitration high state.

In some embodiments, the apparatus may be operable to detect, by the second master device, the state of the SPI hold signal in response to a falling edge of the SPI arbitration signal that corresponds to a transition from the arbitration high state to the arbitration low state and the SPI hold signal being in an available state.

In some embodiments, the apparatus may be operable to communicating between the first master device and the slave device via the SPI while the first master device controls the serial bus.

In some embodiments, the apparatus may be operable to control, by the first master device, the serial bus for a first control duration.

In some embodiments, the apparatus may be operable to toggle the SPI arbitration signal includes toggling the SPI arbitration signal periodically according to an arbitration period.

In some embodiments, the arbitration period may be shorter in duration than the first control duration.

In some embodiments, the first master device may be configured to limit the first control duration to a maximum control duration.

In some embodiments, the apparatus may be operable to change, by the first master device, the SPI hold signal to an available state to release control of the serial bus.

In some embodiments, the apparatus may be operable to change, by the second master device, the SPI hold signal to an unavailable state based on identifying availability of the serial bus.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

A system and method are provided to enable first and second devices coupled to a SPI bus to operate as master devices on the SPI bus without collisions between the two devices or race conditions with respect to obtaining control over the SPI bus.

Figure 1:
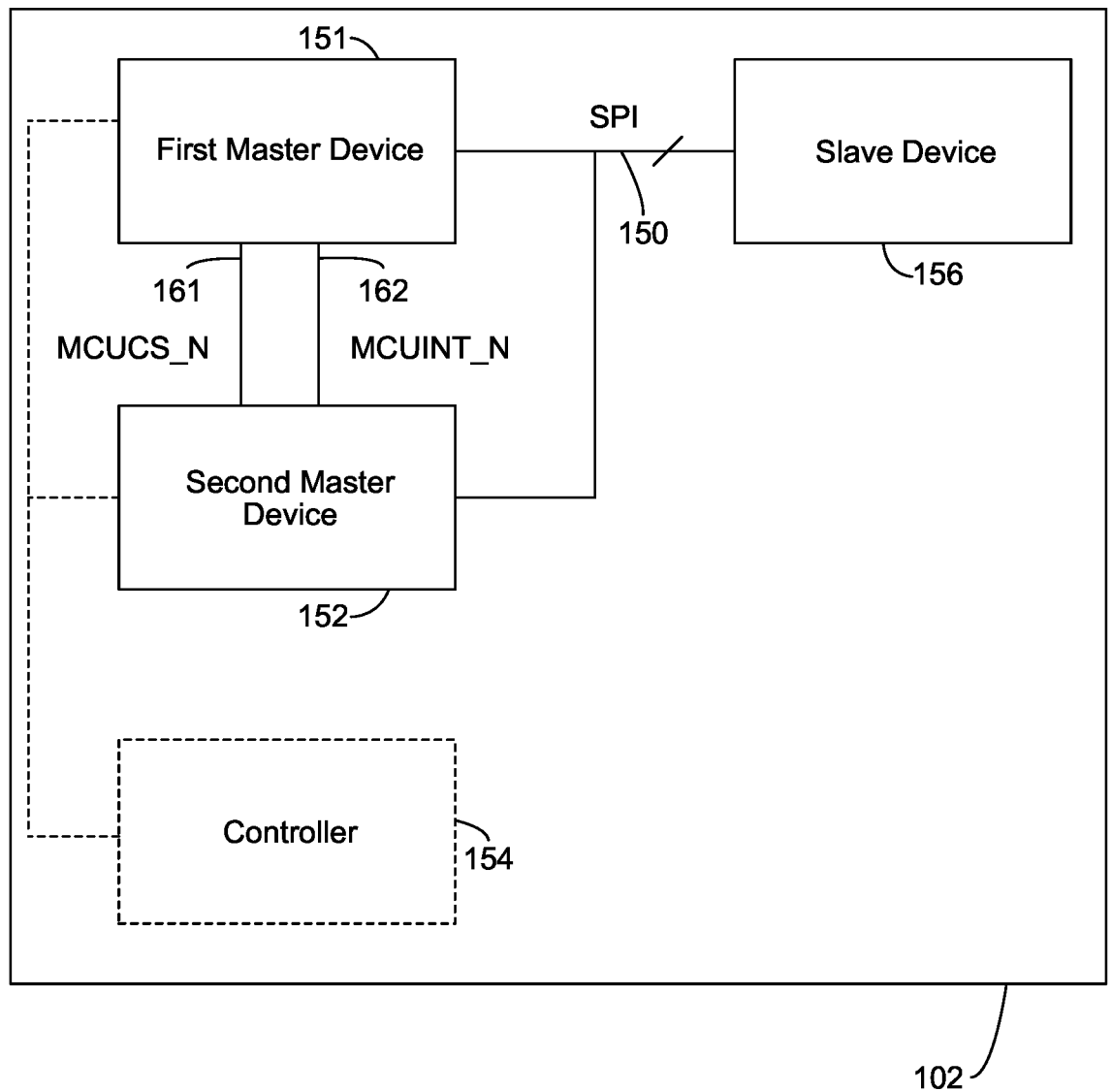
FIG. 1 shows a device in one embodiment according to the present disclosure.

A device or platform in accordance with one embodiment is depicted in the illustrated embodiment of FIG. 1 and generally designated 102. The platform 102 may include a first device 151 and a second device 152, both of which may operate as master devices with respect to a SPI bus 150. A slave device 156 may be coupled to the SPI bus 150, and operable to communicate with one or both of the first and second devices 151, 152. Additional slave devices 156 may be coupled to the SPI bus 150. As described herein, a controller 154 may be provided to control operation of the first and second devices 151, 152. The first device 151 may correspond to a Bluetooth Low Energy (BLE) controller, the second device 152 may correspond to an Ultrawide Band (UWB) controller, and the slave device 156 may correspond to a CAN controller operable to communicate with either of the BLE controller or the UWB controller to enable transmission and reception of CAN communications for both the BLE controller and the UWB controller. Applications for such CAN communications include phone-as-a-key systems for objects (e.g., a vehicle) and smartphones, including for instance the system described in U.S. Pub. 2021/0392461, entitled SYSTEM AND METHOD FOR AUTOMATED DATA COLLECTION AND ANCHOR LOCATION EVALUATION, published Dec. 16, 2021, to Cooper et al.—the disclosure of which is hereby incorporated by reference in its entirety.

Figure 2:
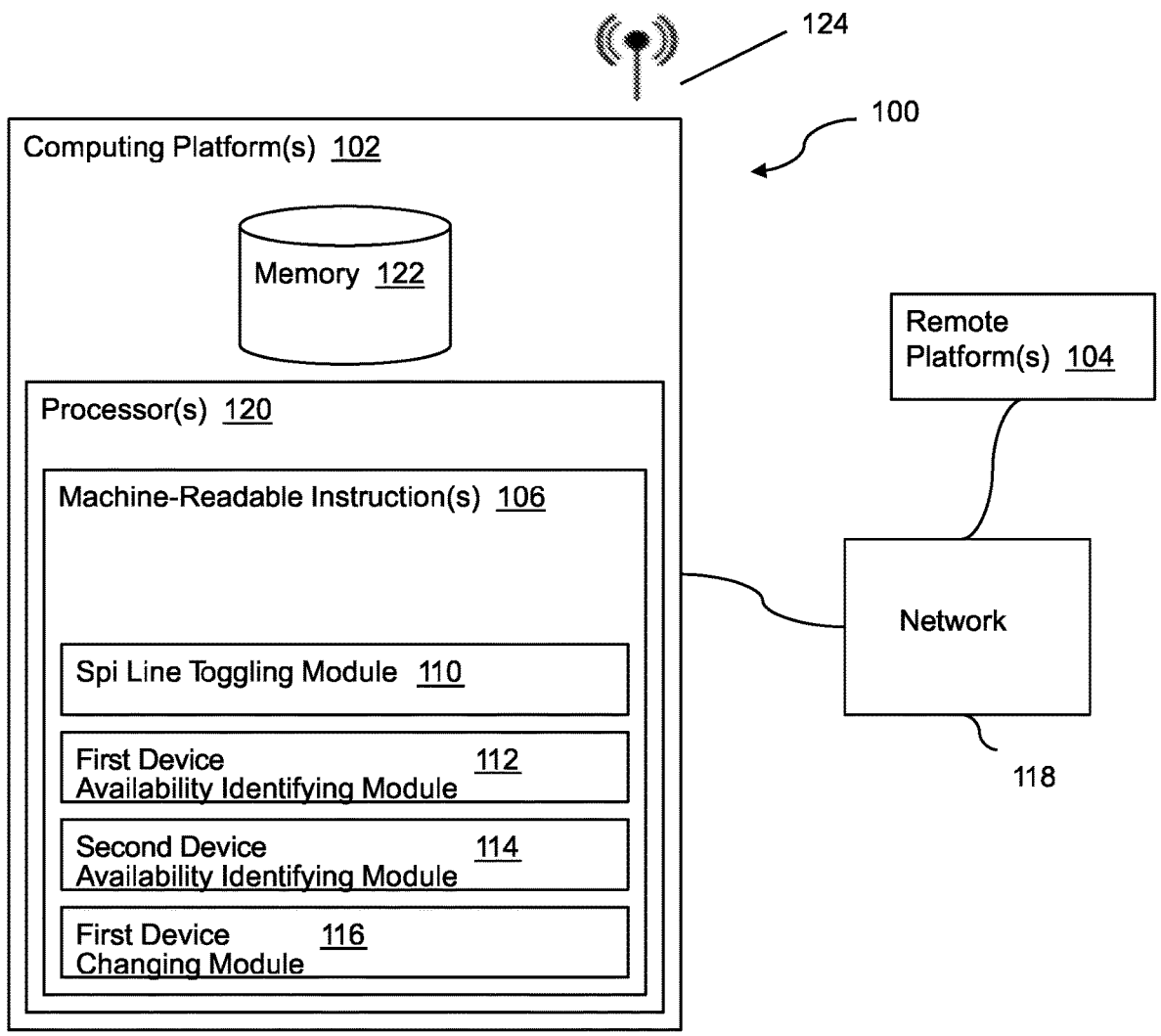
FIG. 2 shows a system configured for communicating with a slave device via a slave SPI.

FIG. 2 illustrates a system configured for communicating with a slave device via a slave SPI, in accordance with one or more embodiments. In some cases, the system 100 may include one or more computing platforms 102. Optionally, the one or more computing platforms 102 may be communicably coupled with one or more remote platforms 104. In some cases, users may access the system 100 via remote platform(s) 104.

The one or more computing platforms 102 may be configured by machine-readable instructions 106. Machine-readable instructions 106 may include modules. The modules may be implemented as one or more of functional logic, hardware logic, electronic circuitry, software modules, and the like. The modules may include one or more of a SPI line toggling module 110, a first device availability identifying module 112, a second device availability identifying module 114, a first device changing module 116, and/or other modules. The modules are described in conjunction with a computing platform 102, which may include more than one device or component (e.g., first and second devices, a slave device, and a controller). One or more modules may be provided in one device or component, and one or more other modules may be provided in another device or component. The first device 151 may include an arbitration interface operable to detect a state of and/or control operation of one or both of a SPI arbitration signal 161 and a SPI hold signal 162. The arbitration interface may include the first device availability identifying module 112. The second device 152 may also include an arbitration interface operable to detect a state of and/or control operation of one or both of a SPI arbitration signal 161 and a SPI hold signal 162, and where the arbitration interface may include the second device availability identifying module 114.

The computing platform 102 may include a SPI bus 150 operable to facilitate communication between a first device 151 and a slave device 156 and between a second device 152 and the slave device 156. The SPI bus 150 may be shared by the first device 151, the second device 152, and the slave device 156. It is noted that additional slave devices 156 may be coupled to the SPI bus 150 for communication via the SPI bus 150. The first device 151 and the second device 152 may operate independently. Alternatively, operation of the first and second devices 151, 152 may be directed by a controller 154, which is shown in dashed lines as an optional component. The first and second devices 151, 152 may be provided on the same circuit board assembly or separate circuit board assemblies.

In the illustrated embodiment, the first device 151 corresponds to a UWB controller, and the second device corresponds to a BLE controller. The slave device 156 is a CAN controller operable to facilitate communication, via the SPI bus 150, between a CAN bus (not shown) and the first and second devices 151, 152. The first and second devices 151, 152 may operate as master devices with respect to the slave device 156, as described herein. It is to be understood that the present disclosure is not limited to a configuration that involves the first and second devices 151, 152 being a UWB controller and a BLE controller, or the slave device 156 being a CAN controller; the first and second devices 151, 152 and the slave device 156 may be any type of devices that utilize a SPI bus 150 in accordance with one embodiment.

The SPI line toggling module 110, in one embodiment, may be configured to toggle a SPI arbitration signal 161 between an arbitration high state and an arbitration low state. The SPI line toggling module 110 may be provided in the first device 151, which may operate as a master time share device between the first and second devices 151, 152. The second device may operate as a slave time share device in this context. It is noted that the present disclosure is not limited to the first and second devices 151, 152 being the only master devices for the SPI bus 150; one or more additional devices may be provided to operate as master devices on the SPI bus 150. Coordination of which device is operating as the master device may be conducted in accordance with one embodiment of the present disclosure.

In one embodiment, the SPI line toggling module 110 may be configured to toggle the SPI arbitration signal 161 periodically (e.g., every 5 ms based on a 5 ms CAN task). In the illustrated embodiment, the first device 151, operating as a master time share device, includes the SPI line toggling module 110 and toggles the SPI arbitration signal 161 accordingly.

An availability identifying module 112 may be provided in the first device 151 and may be configured to identify availability of the SPI bus 150 based on 1) the SPI arbitration signal 161 being in the arbitration high state and 2) detection of a SPI hold signal 162 being in an available state. The availability identifying module 112 may monitor the SPI arbitration signal 161 for arbitration high states. This may involve detecting rising edges of the SPI arbitration signal 161, and at each rising edge, determining if the SPI hold signal 162 indicates an available state.

If the SPI hold signal 162 indicates an available state, and the first device 151 has a pending SPI transaction, the first device 151 may change the state of the SPI hold signal 162 to an unavailable state in order to indicate to the second device 152 that the SPI bus 150 is unavailable. Alternatively, the first device 151 may hold the SPI arbitration signal 161 in an arbitration high state, which may effectively prevent the second device 152 from making a determination as to whether the SPI bus 150 is available. After the first device 151 has indicated it is in control of the SPI bus 150, the first device 151 may operate as the master device of the SPI bus 150 by beginning the SPI transaction.

If the SPI hold signal 162 indicates an unavailable state, the availability identifying module 112 may wait until the next rising edge of the SPI arbitration signal 161 to repeat the determination of whether the SPI hold signal 162 indicates an available state.

After the availability identifying module 112 determines that the SPI bus 150 is available, as described herein, the first device 151 may change the state of the SPI hold signal 162 to an unavailable state or hold the SPI arbitration signal 161 in an arbitration high state, or both. This way, the first device 151 may indicate it is in control of the SPI bus 150. At this stage, if the first device 151 is indicating it is in control of the SPI bus 150, the first device 151 may operate as the master of the SPI bus 150. The first device 151 may include a changing module 116 configured to change the state or control over one or both of the SPI arbitration signal 161 and the SPI hold signal 162, in order to indicate the SPI bus 150 is in an unavailable state with respect to other devices (e.g., the second device 152) and such that the first device 151 is in control over the SPI bus 150.

The first device 151 operating in this mode as the master may perform one or more pending SPI transactions. After one or more of the pending SPI transactions have completed, the first device 151 may resume toggling the SPI arbitration signal 161, which may enable the second device 152 to take control of the SPI bus 150 as the master, if the second device 152 has one or more pending SPI transactions. As described herein, the second device 152 may determine the SPI bus 150 is unavailable based on a state of the SPI arbitration signal 161 being in a high state or without identifying a falling edge transition of the SPI arbitration signal 161 from a high state to a low state.

In an alternative embodiment, the SPI hold signal 162 may be under control of the second device 152, and the SPI arbitration signal 161 may be under control of the first device, where determinations about holding the SPI bus 150 for communications can be coordinated, based on the SPI arbitration signal 161, with the first device 151 making determinations at rising edges or high states and with the second device 152 making determinations at falling edges or low states for the second device. This way, the first and second device 151, 152 may avoid a race condition with respect to being a master device on the SPI bus 150.

In one embodiment, toggling the SPI arbitration signal 161 includes toggling the SPI arbitration signal periodically according to an arbitration period. The arbitration period may be shorter in duration than a control duration with respect to the first and second devices 151, 152. As a result, the first device 151 and the second device 152 may control the SPI bus 150 for a control duration that is longer than the arbitration, such that the control duration is greater than a multiple of the arbitration period. As described herein, the first device 151 and the second device 152 may be configured to limit the control duration to a maximum control duration.

The second device 152 may include an availability identifying module 114 that may be configured to identify availability of the serial bus based on 1) the SPI arbitration signal being the arbitration low state and 2) detection of the SPI hold signal being in the available state. Instead of determining availability based on the SPI arbitration signal 161 being in a high state, like the first device 151, the availability identifying module 114 of the second device 152 may determine availability based on the SPI arbitration signal 161 being in a low state. In one example, the availability identifying module 114 may determine availability in response to falling edges of the SPI arbitration signal 161 from a high state to a low state.

In the second device 152, if the availability identifying module 114 determines the SPI bus 150 is in an available state and the second device 152 has a pending transaction, the second device 152 may change the state of the SPI hold signal 162 to an unavailable state in order to indicate to the first device 151 that the SPI bus 150 is unavailable. After the second device 152 has indicated it is in control of the SPI bus 150, the second device 152 may operate as the master device of the SPI bus 150 by beginning the SPI transaction.

If the availability identifying module 114 determines the SPI bus 150 is in an unavailable state, the availability identifying module 114 may wait until after the next falling edge of the SPI arbitration signal 161 to repeat the determination of whether the SPI bus 150 is in an available state. The availability identifying module 114 determines availability with respect to the SPI bus 150 in response to falling edges of the SPI arbitration signal 161.

The availability identifying module 114 may determine the SPI bus is available in a variety of ways depending on the application. In the illustrated embodiment, the availability identifying module 114 may determine the SPI bus 150 is available based on identifying a falling edge of the SPI arbitration signal 161, which is under control of the first device 151.

Alternatively, the availability identifying module 114 may determine the SPI bus 150 is available based on the SPI hold signal 162 being in an available state. As described herein, the availability identifying module may determine whether the SPI hold signal 162 is in an available state when the SPI arbitration signal 161 is in a low state, including in response to when the SPI arbitration signal 161 transitions from a high state to the low state.

If the second device 152 indicates to the first device 151 that the second device 152 is in control of the SPI bus 150 (e.g., by changing a state of the SPI hold signal 162 to an unavailable state), the second device 152 may operate as the master and perform one or more pending SPI transactions. After one or more of the pending SPI transactions have completed, the second device 152 may change the state of the SPI hold signal 162 to an available state in order to indicate to the first device 151 that the SPI bus 150 is no longer under control of the second device 152.

In one embodiment, the first device 151 and the second device 152 may each assert control over the SPI bus 150. The respective timing for taking control over the SPI bus 150 may be configured such that a race condition is avoided between the first device 151 and the second device 152. The first device 151 and the second device 152 may each control respectively whether to release the SPI bus 150 after taking control over the SPI bus 150. As a result, for example, if the first device 151 takes control over the SPI bus 150, the second device 152 may be prevented from taking control until the first device 151 indicates to the second device 152 that the first device 151 no longer has control over the SPI bus 150.

In one embodiment, there is a potential for a device to hold the SPI bus 150 indefinitely and prevent the other device from gaining control over the SPI bus 150. As a result, the devices configured to take control over the SPI bus 150 in accordance with one or more embodiments may be configured to limit a duration of control over the SPI bus 150. For instance, the devices may be configured to release control over the SPI bus 150 according to the lesser of 1) a maximum control duration (e.g., 50 ms) or 2) a time to complete all pending SPI transactions. In this way, if the maximum control duration is reached before all pending SPI transactions are completed, a device may release control over the SPI bus 150 and attempt to regain control (e.g., at the next rising edge or falling edge of the SPI arbitration signal 161) over the SPI bus 150 after another device has had an opportunity to take control over the SPI bus 150 and complete one or more pending SPI transactions.

In one embodiment, the first device 151 or second device 152, or both, may be configured to operate without limitations on duration of control. Such a configuration may be permanent or temporary (e.g., a temporary override for an override type of SPI transactions). For instance, if the first device 151 initiates an override type of SPI transactions that correspond to a firmware upgrade, the first device 151 may be configured to take control of the SPI bus 150 and to release control of the SPI bus 150 after all of the SPI transactions associated with the firmware upgrade have completed, regardless of whether the duration of the SPI transactions extends beyond any limitations on duration of control of the SPI bus 150.

In one embodiment, the first and second devices 151, 152 may be configured to determine whether the SPI bus 150 is available based on a state of the SPI arbitration signal 161 being in a high state or a low state. The determination may be conducted in response to a transition from a high state to a low state (e.g., a rising edge) or from a low state to a high state (e.g., a falling edge). It is to be understood that the present disclosure is not so limited; the determination may be conducted in response to more complex state changes of the SPI arbitration signal 161, including encoded data, such as encoded data that may be associated with one of the devices (e.g., the first and second devices 151, 152). Such complex state changes may still involve the SPI arbitration signal 161 being in a high or low state when the first and second devices 151, 152 determine to check availability of the SPI bus 150.

In some cases, the one or more computing platforms 102 may be communicatively coupled to the remote platform(s) 104. In some cases, the communicative coupling may include communicative coupling through a networked environment 118. The networked environment 118 may be a radio access network, such as LTE or 5G, BLE, UWB, a local area network (LAN), a wide area network (WAN) such as the Internet, or wireless LAN (WLAN), for example. It is to be understood that this is not intended to be limiting, and that the scope of this disclosure includes implementations in which one or more computing platforms 102 and remote platform(s) 104 may be operatively linked via another communication coupling. The one or more computing platforms 102 may be configured to communicate with the networked environment 118 via wireless or wired connections. In addition, in one embodiment, the one or more computing platforms 102 may be configured to communicate directly with each other via wireless or wired connections. Examples of one or more computing platforms 102 may include, but is not limited to, smartphones, wearable devices, tablets, laptop computers, desktop computers, Internet of Things (IoT) device, or other mobile or stationary devices, including devices disposed on a vehicle or other type of object. In one embodiment, the system 100 may also include one or more hosts or servers, such as the one or more remote platforms 104 connected to the networked environment 118 through wireless or wired connections. According to one embodiment, remote platforms 104 may be implemented in or function as base stations. In other embodiments, remote platforms 104 may include web servers, mail servers, application servers, etc. According to certain embodiments, remote platforms 104 may be standalone servers, networked servers, or an array of servers.

The one or more computing platforms 102 may include one or more processors 120 for processing information and executing instructions or operations. The one or more processors 120 may be any type of general or specific purpose processor. In some cases, multiple processors 120 may be utilized according to other embodiments. The one or more processors 120 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more processors 120 may be remote from the one or more computing platforms 102, such as disposed within a remote platform like the one or more remote platforms 104 of FIG. 2.

The one or more processors 120 may perform functions associated with the operation of the system 100 which may include, for example, precoding of antenna gain/phase parameters, encoding and decoding of individual bits forming a communication message, formatting of information, and overall control of the one or more computing platforms 102, including processes related to management of communication resources.

The one or more computing platforms 102 may further include or be coupled to a memory 122 (internal or external), which may be coupled to one or more processors 120, for storing information and instructions that may be executed by one or more processors 120. Memory 122 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 122 can consist of any combination of random access memory (RAM), read only memory (ROM), static storage such as a magnetic or optical disk, hard disk drive (HDD), or any other type of non-transitory machine or computer readable media. The instructions stored in memory 122 may include program instructions or computer program code that, when executed by one or more processors 120, enable the one or more computing platforms 102 to perform tasks as described herein.

In some embodiments, one or more computing platforms 102 may also include or be coupled to one or more antennas 124 for transmitting and receiving signals and/or data to and from one or more computing platforms 102. The one or more antennas 124 may be configured to communicate via, for example, a plurality of radio interfaces that may be coupled to the one or more antennas 124. The radio interfaces may correspond to a plurality of radio access technologies including one or more of LTE, 5G, WLAN, BLE, near field communication (NFC), radio frequency identifier (RFID), UWB, and the like. The radio interface may include components such as filters, converters (for example, digital-to-analog converters and the like), mappers, a Fast Fourier Transform (FFT) module, and the like, to generate symbols for a transmission via one or more downlinks and to receive symbols (for example, via an uplink).

Figure 3:
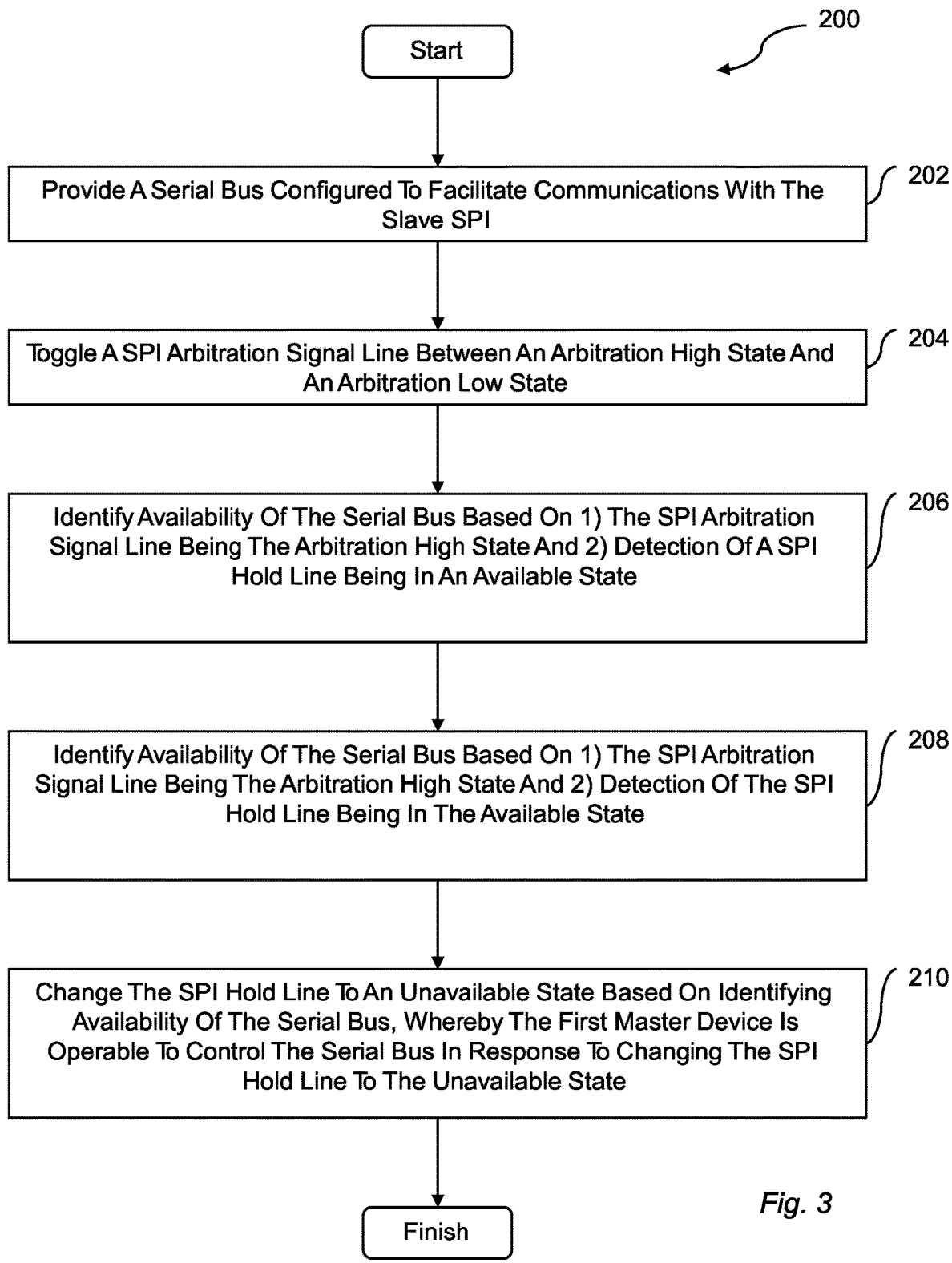
FIG. 3 shows a method for communicating with a slave device via a slave SPI.

FIG. 3 illustrates an example flow diagram of a method 200, according to one embodiment. The method 200 may include providing a serial bus configured to facilitate communications with the slave SPI. Step 202. The method 200 may include toggling a SPI arbitration signal between an arbitration high state and an arbitration low state. Step 204. The method 200 may include identifying, in a first master device, availability of the serial bus based on 1) the SPI arbitration signal being the arbitration high state and 2) detection of a SPI hold signal being in an available state. Step 206. The method 200 may include identifying, in a second master device, availability of the serial bus based on 1) the SPI arbitration signal being the arbitration low state and 2) detection of the SPI hold signal being in the available state. Step 208. The method 200 may include changing, by the first master device, the SPI hold signal to an unavailable state based on identifying availability of the serial bus, whereby the first master device is operable to control the serial bus in response to changing the SPI hold signal to the unavailable state. Step 210.

In some cases, the method 200 may be performed by one or more hardware processors, such as the processors 120 of FIG. 2, configured by machine-readable instructions, such as the machine-readable instructions 106 of FIG. 2. In this aspect, the method 200 may be configured to be implemented by the modules, such as the modules 110, 112, 114 and/or 116 discussed above in FIG. 2.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claims are defined as follows:

1. A system for communicating with a slave device via a slave serial peripheral interface (SPI), the system comprising:
   a serial bus configured to facilitate communications with the slave SPI;
   a first master device operably coupled to the serial bus to communicate with the slave device via the slave SPI;
   a second master device operably coupled to the serial bus to communicate with the slave device via the slave SPI; and
   an arbitration interface established between the first master device and the second master device, the arbitration interface including a SPI hold signal and a SPI arbitration signal, wherein the SPI arbitration signal is toggled between an arbitration high state and an arbitration low state;
   wherein the first master device is operable to identify availability of the serial bus based on 1) the SPI arbitration signal being the arbitration high state and 2) detection of the SPI hold signal being in an available state; and
   wherein the second master device is operable to identify availability of the serial bus based on 1) the SPI arbitration signal being the arbitration low state and 2) detection of the SPI hold signal being in the available state.

2. The system of claim 1 wherein:
   the first master device is operable to detect a state of the SPI hold signal in response to a rising edge of the SPI arbitration signal that corresponds to a transition from the arbitration low state to the arbitration high state; and
   the second master device is operable to detect the state of the SPI hold signal in response to a falling edge of the SPI arbitration signal that corresponds to a transition from the arbitration high state to the arbitration low state and the SPI hold signal being in an available state.

3. The system of claim 2 wherein the first master device and the second master device are operable to abstain from controlling the serial bus despite the serial bus being respectively available for the first master device and the second master device.

4. The system of claim 1 wherein the first master device is operable to change the SPI hold signal to an unavailable state based on identifying availability of the serial bus, whereby the first master device is operable to control the serial bus in response to changing the SPI hold signal to the unavailable state.

5. The system of claim 4 wherein the first master device is operable to communicate with the SPI of the slave device via the serial bus while controlling the serial bus.

6. The system of claim 4 wherein the first master device is operable to control the serial bus for a first control duration.

7. The system of claim 6 wherein the SPI arbitration signal is toggled periodically according to an arbitration period.

8. The system of claim 7 wherein the arbitration period is shorter in duration than the first control duration.

9. The system of claim 8 wherein the first master device is configured to limit the first control duration to a maximum control duration.

10. The system of claim 4 wherein the first master device is operable to change the SPI hold signal to an available state to release control of the serial bus.

11. The system of claim 1 wherein the second master device is operable to change the SPI hold signal to an unavailable state based on identifying availability of the serial bus.

12. A method of communicating with a slave device via a slave serial peripheral interface (SPI), the method comprising:
    providing a serial bus configured to facilitate communications with the slave SPI;
    toggling a SPI arbitration signal between an arbitration high state and an arbitration low state;
    identifying, in a first master device, availability of the serial bus based on 1) the SPI arbitration signal being the arbitration high state and 2) detection of a SPI hold signal being in an available state;
    identifying, in a second master device, availability of the serial bus based on 1) the SPI arbitration signal being the arbitration low state and 2) detection of the SPI hold signal being in the available state; and
    changing, by the first master device, the SPI hold signal to an unavailable state based on identifying availability of the serial bus, whereby the first master device is operable to control the serial bus in response to changing the SPI hold signal to the unavailable state.

13. The method of claim 12 comprising:
detecting, by the first master device, a state of the SPI hold signal in response to a rising edge of the SPI arbitration signal that corresponds to a transition from the arbitration low state to the arbitration high state; and
detecting, by the second master device, the state of the SPI hold signal in response to a falling edge of the SPI arbitration signal that corresponds to a transition from the arbitration high state to the arbitration low state and 2) the SPI hold signal being in an available state.

14. The method of claim 12 comprising communicating between the first master device and the slave device via the SPI while the first master device controls the serial bus.

15. The method of claim 12 comprising the controlling, by the first master device, the serial bus for a first control duration.

16. The method of claim 15 wherein toggling the SPI arbitration signal includes toggling the SPI arbitration signal periodically according to an arbitration period.

17. The method of claim 16 wherein the arbitration period is shorter in duration than the first control duration.

18. The method of claim 17 wherein the first master device is configured to limit the first control duration to a maximum control duration.

19. The method of claim 12 comprising changing, by the first master device, the SPI hold signal to an available state to release control of the serial bus.

20. The method of claim 19 comprising changing, by the second master device, the SPI hold signal to an unavailable state based on identifying availability of the serial bus.

21. An apparatus, comprising:
at least one memory storing computer program instructions; and
at least one processor configured to execute the computer program instructions to cause the apparatus at least to:
provide a serial bus configured to facilitate communications with the slave SPI;
toggle a SPI arbitration signal between an arbitration high state and an arbitration low state;
identify, in a first master device, availability of the serial bus based on 1) the SPI arbitration signal being the arbitration high state and 2) detection of a SPI hold signal being in an available state;
identify, in a second master device, availability of the serial bus based on 1) the SPI arbitration signal being the arbitration low state and 2) detection of the SPI hold signal being in the available state; and
change, by the first master device, the SPI hold signal to an unavailable state based on identifying availability of the serial bus, whereby the first master device is operable to control the serial bus in response to changing the SPI hold signal to the unavailable state.

22. The apparatus of claim 21 comprising:
detecting, by the first master device, a state of the SPI hold signal in response to a rising edge of the SPI arbitration signal that corresponds to a transition from the arbitration low state to the arbitration high state; and
detecting, by the second master device, the state of the SPI hold signal in response to a falling edge of the SPI arbitration signal that corresponds to a transition from the arbitration high state to the arbitration low state and 2) the SPI hold signal being in an available state.

23. The apparatus of claim 21 comprising communicating between the first master device and the slave device via the SPI while the first master device controls the serial bus.

24. The apparatus of claim 23 comprising the controlling, by the first master device, the serial bus for a first control duration.

25. The apparatus of claim 23 wherein toggling the SPI arbitration signal includes toggling the SPI arbitration signal periodically according to an arbitration period.

26. The apparatus of claim 25 wherein the arbitration period is shorter in duration than the first control duration.

27. The apparatus of claim 26 wherein the first master device is configured to limit the first control duration to a maximum control duration.

28. The apparatus of claim 21 comprising changing, by the first master device, the SPI hold signal to an available state to release control of the serial bus.

29. The apparatus of claim 28 comprising changing, by the second master device, the SPI hold signal to an unavailable state based on identifying availability of the serial bus.

\* \* \* \* \*